US006677895B1

United States Patent
Holt (10) Patent No.: US 6,677,895 B1
(45) Date of Patent: Jan. 13, 2004

(54) SYSTEM AND METHOD FOR DETERMINING THE LOCATION OF A TRANSMITTING MOBILE UNIT

(75) Inventor: Brian P. Holt, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/440,773

(22) Filed: Nov. 16, 1999

(51) Int. Cl.$^7$ .............................. G01S 5/14; G01S 3/02; H04Q 7/20
(52) U.S. Cl. ............................ 342/357.1; 342/357.14; 342/465; 455/456.5
(58) Field of Search ................... 342/357.14, 357.1, 342/465, 463; 455/456.5

(56) References Cited

U.S. PATENT DOCUMENTS

| | | | |
|---|---|---|---|
| 5,251,249 A | 10/1993 | Allen et al. | 379/59 |
| 5,365,450 A | 11/1994 | Schuchman et al. | 364/449 |
| 5,404,392 A | 4/1995 | Miller et al. | 379/60 |
| 5,422,813 A | 6/1995 | Schuchman et al. | 364/449 |
| 5,600,706 A | 2/1997 | Dunn et al. | 379/59 |
| 5,604,765 A | 2/1997 | Bruno et al. | 375/200 |
| 5,661,652 A | 8/1997 | Sprague et al. | 364/449 |
| 5,719,584 A | 2/1998 | Otto | 342/465 |
| 5,726,663 A | 3/1998 | Moyer et al. | 342/419 |
| 5,736,962 A | 4/1998 | Tendler | 342/357 |
| 5,736,964 A | 4/1998 | Ghosh et al. | 342/457 |
| 5,742,233 A | 4/1998 | Hoffman et al. | 340/573 |
| 5,764,172 A | 6/1998 | Rodal | 341/145 |
| 5,764,188 A | 6/1998 | Ghosh et al. | 342/457 |
| 5,859,613 A * | 1/1999 | Otto | 342/463 |
| 5,912,887 A | 6/1999 | Sehgal | 370/354 |
| 5,943,413 A | 8/1999 | Ash et al. | 379/220 |
| 5,973,643 A * | 10/1999 | Hawkes et al. | 342/457 |
| 5,982,324 A * | 11/1999 | Watters et al. | 342/357.06 |
| 6,249,252 B1 * | 6/2001 | Dupray | 342/450 |
| 6,252,543 B1 * | 6/2001 | Camp | 342/357.06 |
| 6,374,098 B1 * | 4/2002 | Raith et al. | 455/404 |

OTHER PUBLICATIONS

Krizman, Kevin J. et al "Wirless Position Location: Fundamentals, Implementation Stategies, and Sources of Error," IEEE 47th Vehicular Technology Conference, May 1997, pp. 919–923, vol. 2.*

Caffery, Jr, et al. "Overview of Radiolocations in CDMA Cellular Systems", IEEE Communications Magazine, Apr. 1998, pp. 38–45.*

* cited by examiner

Primary Examiner—Gregory C. Issing
(74) Attorney, Agent, or Firm—Allen, Dyer, Doppelt, Milbrath & Gilchrist, P.A.

(57) ABSTRACT

A system and method of the present invention determines the location of a transmitting mobile unit. A mobile unit has a global positioning system (GPS) unit and transmitter for transmitting an RF signal that includes an identification of the mobile unit and GPS location coordinates, if available. At least one receiver forms a first infrastructure and is contained within an area having good GPS reception for receiving a transmitted signal from the mobile unit when in the area relating to the identification of the mobile unit and the GPS location coordinates or other GPS data obtained from the GPS unit. At least one receiver forms a second infrastructure and is contained within an area having poor GPS reception for receiving transmitted signals from the mobile unit when in the area relating to an identification of the mobile unit and for measuring the angle of arrival and/or time of arrival, multipath profile, or other characteristics of transmitted signals from the mobile unit. A processor determines the location of the mobile unit based on the measured time of arrival and/or angle of arrival.

22 Claims, 6 Drawing Sheets

SYSTEM AND METHOD FOR DETERMINING THE LOCATION OF A TRANSMITTING MOBILE UNIT

FIELD OF THE INVENTION

This invention relates to a system and method for determining the geolocation of a transmitting mobile unit, and more particularly, this invention relates to a system and method of determining the geolocation of a mobile unit using a hybrid GPS system.

BACKGROUND OF THE INVENTION

As wireless phones and the use of other mobile communication units have become commonplace, the need to locate the users of such devices when in distress or for tracking purposes has grown. For example, it may be necessary to determine the location of a mobile unit, such as a caller on a cellular phone in an automobile, when an emergency occurs. There exists a ruling that will soon require that any mobile 911 caller be located within 125 meters of their location based on the call. Additionally, the need to locate automobiles, construction equipment or other objects for purposes of theft recovery or utilization optimization has also grown. Some telecommunications companies are now building wireless telephones that have a global positioning system (GPS) unit inserted into the handset. The location of the phone is determined by the GPS unit and may be reported over the phone. However, there will often be times when a global positioning system unit does not operate correctly, such as in dense urban areas. For example, it is well known that reception of a GPS signal from satellites by a mobile receiver is often blocked by buildings, particularly in dense urban areas.

There are some non-GPS based systems where the location of a mobile unit can be determined from parameters, such as signal strength, angle-of-arrival (AOA), time-of-arrival (TOA), multipath profile or other characteristics of the signal. An example is disclosed in U.S. Pat. No. 5,719,584 to Otto, assigned to Harris Corporation of Melbourne, Fla., the disclosure which is hereby incorporated by reference in its entirety. This signal could be a conventional wireless phone signal. One drawback of a non-GPS based system is the expensive infrastructure of associated receiver sites that typically are required in order to measure the desired characteristics of the signal transmitted by a mobile unit. Additionally, receiver sites having these types of receivers often must be spaced relatively close together because the signal transmitted by the mobile unit must be received simultaneously at two or more receivers in systems performing a multilateration function.

SUMMARY OF THE INVENTION

It is therefore an object of the present invention to provide a system and method of determining the location of a transmitting mobile unit that overcomes the inherent limitations of both GPS and non-GPS based systems to allow the tracking or location of a mobile unit in areas having good GPS reception and in areas having poor GPS reception while minimizing the required infrastructure.

In accordance with the present invention, a system determines the location of a transmitting mobile unit and includes a mobile unit having a global positioning system (GPS) unit and a transmitter for transmitting an RF communication signal comprising an identification of the mobile unit and GPS data, such as latitude and longitude information or other data obtained from the GPS signal, if available. At least one receiver is contained within an area having good GPS reception for receiving a transmitted signal from the mobile unit when in the area relating to the identification of the mobile unit and the GPS location coordinates or other measured data obtained from the GPS unit. Typically, there would be a plurality of the receivers in this area having good GPS reception to form a first network infrastructure. At least one additional receiver forming a second network infrastructure is contained within an area having poor GPS reception, such as an urban area, for receiving transmitted signals from the mobile unit relating to an identification of the mobile unit and for measuring the angle of arrival and/or the time of arrival, multipath profile, or other characteristics of transmitted signals from the mobile unit. These measured parameters are used for determining the location of the mobile unit. Typically, there would be a plurality of the receivers in this area having poor GPS reception.

In one aspect of the present invention, a processor is operatively connected to the second receiver or plurality of receivers forming the second infrastructure for computing the location of a mobile unit based on the measured angle of arrival and/or time of arrival, multipath profile, or other characteristics. A network processor is operatively connected to the first and second plurality of receivers forming the first and second infrastructures for maintaining a real time record of the location of the mobile unit as it travels throughout the areas having good GPS reception and areas having poor GPS reception. A report generator can be connected to the network processor to generate a report of the location of the mobile unit, which could be necessary in some instances where tracking is required, as in convict location determination.

Typically, the mobile unit can comprise a wireless phone or could comprise a small transmitter employing other RF communication means that could be placed on a body for personal tracking of people, such as convicts or small children. Also, the transmitted signal could comprise an emergency transmit signal to a 911 call center.

In still another aspect of the present invention, the system for determining the location of a transmitting mobile unit comprises a mobile unit having a global positioning system (GPS) unit and a spread spectrum transmitter for transmitting a wideband signal, such as a chirp, containing modulated digital data that includes an identification of the mobile unit and GPS location coordinates, if available. At least one receiver is contained within an area having good GPS reception for receiving a transmitted signal from the mobile unit relating to an identification of the mobile unit and GPS data coordinates obtained from the GPS unit when the mobile unit is located in the area.

At least one second receiver forms a second infrastructure and is contained within an area having poor GPS reception, such as an urban area, for receiving transmitted signals from a mobile unit relating to an identification of the mobile unit and for measuring the angle of arrival of a signal and/or the time of arrival of transmitted signals from the mobile unit to determine the location of the mobile unit. Each of the receivers can comprise a chirp signal generator and a mixer which periodically mixes a lower frequency signal with the chirp signal received from the chirp signal generator to produce a wave signal having a frequency related to a time relationship between the start of the chirp signal and the start of digital data. This type of apparatus is advantageous for use in small pocket transmitters and is sufficient for a large number of users in an area.

In still another aspect of the present invention, the system for determining the location of a mobile device can comprise a mobile unit having a global positioning system (GPS) receiver and a cellular transceiver unit is used for transmitting an RF communication signal comprising a transmitted message, an identification, and GPS location coordinates or other data, if available. A first plurality of cellular base stations forms a first infrastructure and are contained within an area having good GPS reception for receiving a transmitted signal from the mobile unit. The signal comprises a message portion and a portion relating to an identification for the mobile unit and GPS location coordinates or other data obtained from the GPS unit.

At least one second cellular base station forms a second infrastructure and can be contained within areas having poor GPS reception for receiving a transmitted signal from the mobile unit where the signal includes a message and an identification of the mobile unit. Each cellular base station in the second infrastructure has an overlay network receiver for receiving a transmitted signal from the cellular phone and measuring the angle of arrival, and/or the time of arrival, multipath profile or other characteristics of the transmitted signals from the mobile unit. A processor is operatively connected to the second infrastructure of cellular base stations and overlay receivers for computing the location of the mobile unit contained within the area covered by the second receiver or receivers based on the measured angle of arrival and/or time of arrival, multipath profile or other characteristics.

In a method aspect of the present invention, the method obtains data from a GPS unit and may be used to determine determines the location of a transmitting mobile unit and comprises the step of transmitting an RF signal comprising an identification and GPS location coordinates or other data, if available, from a mobile unit that comprises a global positioning system (GPS) unit and transmitter. The method also includes the step of receiving a transmitted signal within an area having poor GPS reception from the mobile unit relating to an identification of the mobile unit within at least one receiver contained within an area having poor GPS reception. The method further comprises the step of measuring the angle of arrival and/or the time of arrival, multipath profile or other characteristics of transmitted signals from the mobile unit to determine the location of the mobile unit.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention is advantageous because the hybrid GPS format using a first plurality of receivers in a first network infrastructure, and a second plurality of receivers in a second network infrastructure allows location determining capability in urban shadow areas where a global positioning system (GPS) alone does not work. These advantages could include the location of mobile units while inside. A lower cost infrastructure can be applied versus that required for a non-GPS based system covering the same geographic area. No additional hardware is typically required in a mobile unit than required for a GPS based system in which the location information is required at a location other than the mobile unit.

Throughout the description, a type I receiver site will be described with reference to an area with good GPS reception, such as a suburban/rural area. A type II receiver site will be associated with an area having poor GPS reception, such as an urban area. Type II receiver sites will measure angle of arrival and/or time of arrival, multipath profile or other characteristics of a signal, as well as demodulate data, such as an ID number and a message sent from a mobile unit, typically a cellular phone. The mobile units, however, could also include a personal locator or tracking unit, such as a Microtrax™ locator unit produced by Harris Corporation of Melbourne, Fla. The mobile unit will typically have a GPS unit, but can also include an asynchronous beaconing transmitter for use with a non-GPS based location determining system, such as applicable with the Microtrax™ locator unit that can be very small, low cost and have low power consumption mobile device and system.

Figure 1:
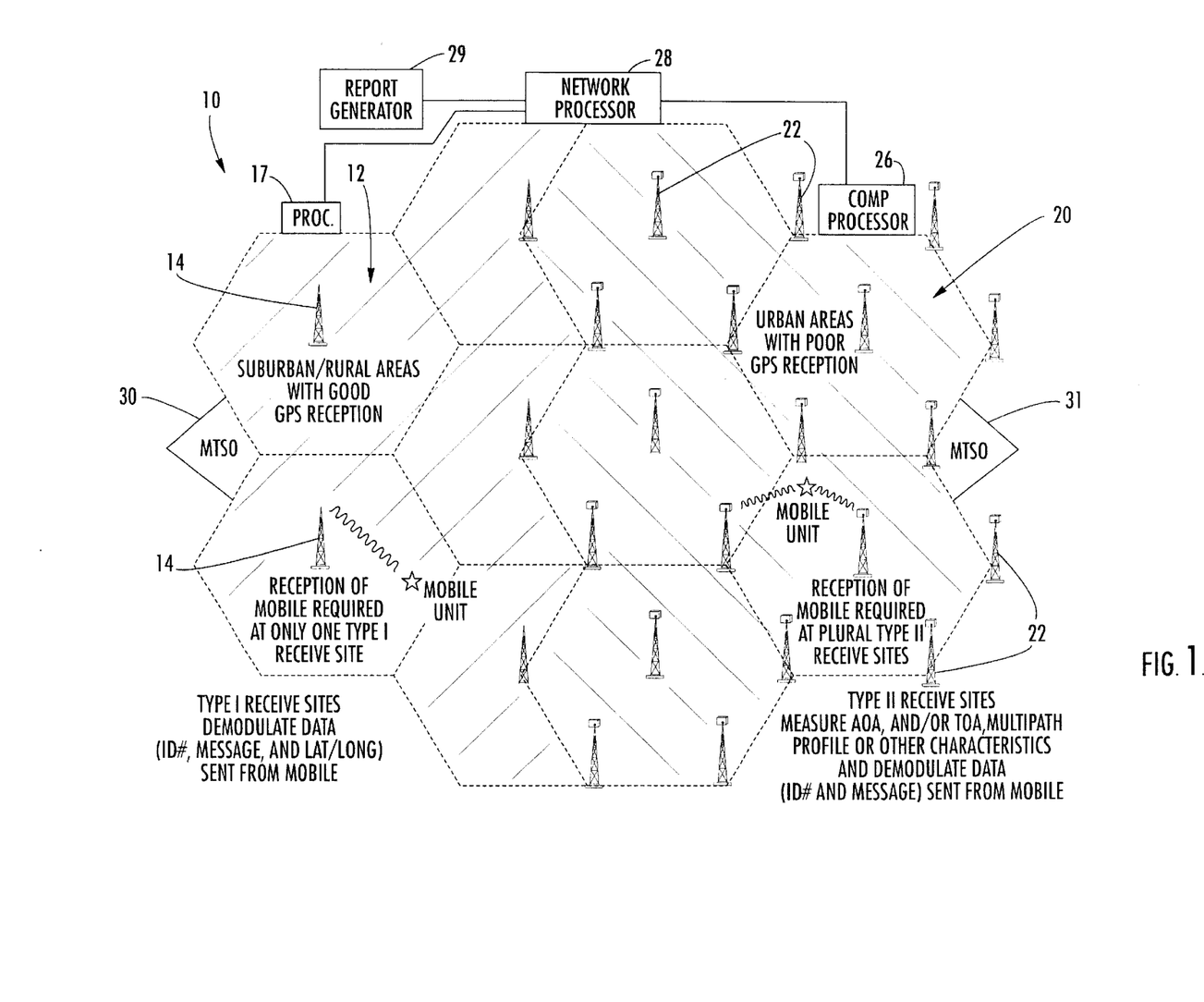
FIG. 1 is an overall schematic view of the system of the present invention showing a first plurality of receivers contained within an area having good GPS reception and a second plurality of receivers contained within an area having poor GPS reception that use angle of arrival and/or time of arrival, multipath profile or other characteristics to determine location.

FIG. 1 illustrates the overall network system 10 using the first infrastructure 12 of type I receiver sites where at least one type I receiver 14 and typically a plurality of receivers are contained within an area, such as a rural or suburban area, having good GPS reception. The type I receivers 14 receive a transmitted signal from the mobile unit when the mobile unit is located in the area. The signal includes an identification of the mobile unit and GPS location coordinates, such as latitude and longitude or other data from the GPS unit. Only one type I receiver 14 is required for reception and this receiver demodulates any data, including an identification and a message if the mobile unit is a cellular phone, and the latitude and longitude or other data obtained from the GPS unit. The type I receivers can be cellular base stations. In another aspect of the present invention, the type I receivers 14 could form a thin infrastructure of receivers that are communication receivers only, which demodulate data, including GPS coordinates, as explained below. It is possible that a processor 17 could receive other data from type I sites and calculate the location, based on the other data received from the GPS unit.

A second network infrastructure 20 is formed from at least one type II receiver 22 and contained within an area having poor GPS reception, such as an urban area. Usually, there will be a plurality of the type II receivers in the non-GPS area that form a more dense infrastructure.

The receiver or plurality of receivers formed as type II receivers 22 measure the angle of arrival and/or time of arrival, multipath profile or other characteristics of the signal transmitted by the mobile unit. An example of a modified type of system that can be used is disclosed in the incorporated by reference '584 patent. In one aspect of the present invention, the type II receiver sites are standard cellular base stations that demodulate signal data comprising a message and identification number sent from a mobile unit, e.g., a cellular phone. In another aspect of the present invention, one or more of the cellular base stations in the area with poor GPS reception could include an overlay network receiver 24 that together form an overlay network 26 (FIG. 7) for receiving a transmitted signal from a mobile unit and measuring the angle of arrival and/or time of arrival, multipath profile or other characteristics of the transmitted signal from the mobile unit.

Figure 7:
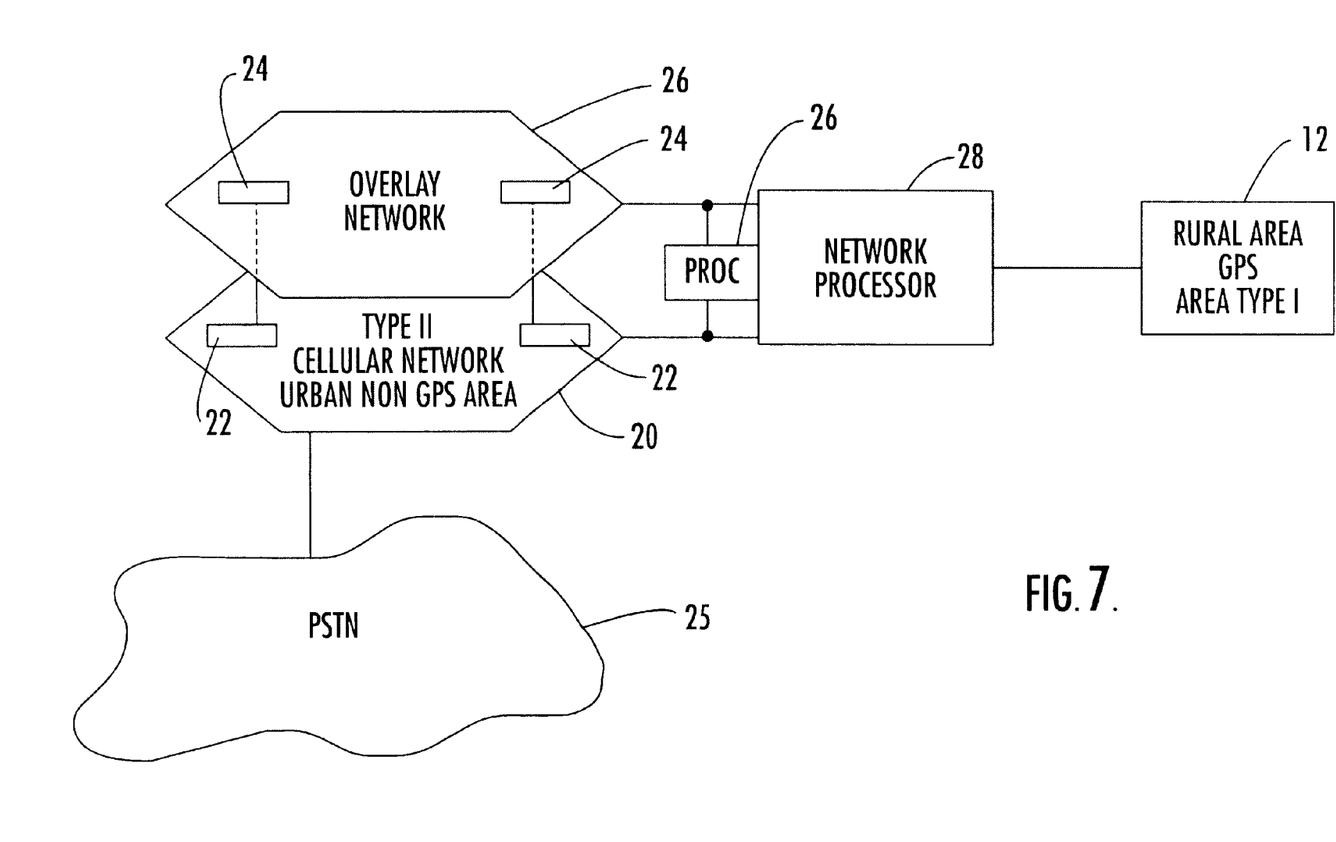
FIG. 7 is a schematic drawing of the overlay network, cellular, and PSTN network and their interconnection.

The overlay network 26 acts in conjunction with the cellular network as illustrated diagrammatically in FIG. 7, where the cellular network forming the second infrastructure of type II receivers connects into the public switched telephone network 25. Examples of various overlay networks used in a cellular systems include those systems disclosed in U.S. Pat. No. 5,251,249 to Allen et al.; U.S. Pat. No. 5,404,392 to Miller et al.; U.S. Pat. No. 5,912,887 to Sehgal; and U.S. Pat. No. 5,943,413 to Ash et al. Thus, the base stations of the cellular network can work in conjunction with the overlay network such that the normal cellular voice and data traffic may flow and mobile unit ID can be determined and measurements made on the signal transmitted by the mobile that can be used to determine the location of the mobile.

The overlay receiver(s) in a "type II area" are not necessarily on a one-to-one relationship with the cellular or wireless base stations in that area, i.e., there may be more overlay receivers than conventional cellular/wireless receivers or vice versa. In addition, an overlay receiver might or might not be colocated with the cellular/wireless base stations and may or may not make use of portions of the base station equipment and may or may not need data generated by the base station. Some overlays might use the base station antenna while others have their own antennas, for example. Some overlay receivers may need data from the base station such as the channel the call is on.

The type II receivers can be cellular/wireless base stations with the added functionality integrated into them to measure time of arrival and/or angle of arrival, multipath profile or other data. A base station manufacturer can modify or design a new base station which is capable of making these types of location determining measurements.

A processor 26 is operatively connected to the type II receiver infrastructure 20 to compute the location of the mobile unit 11 contained within the area covered by the second plurality of receivers based on the measured angle of arrival and/or time of arrival, multipath profile or other characteristics. This processor 26 can communicate with a network processor 28 that is in communication with the first and second infrastructures of type I and type II receivers for maintaining a real time and permanent record of the location of the mobile unit 11. The record keeping function is especially relevant when the mobile unit 11 is a personal tracking unit, such as used for monitoring convicts. The network processor 28 can generate reports through an appropriate report generator circuit 29 or other means. The cellular networks that are formed as type I receiver 14 sites and type II receiver 22 sites are connected to respective mobile telephone switching offices 30,31 for the specific areas containing the type I or type II receiver sites.

Figure 2:
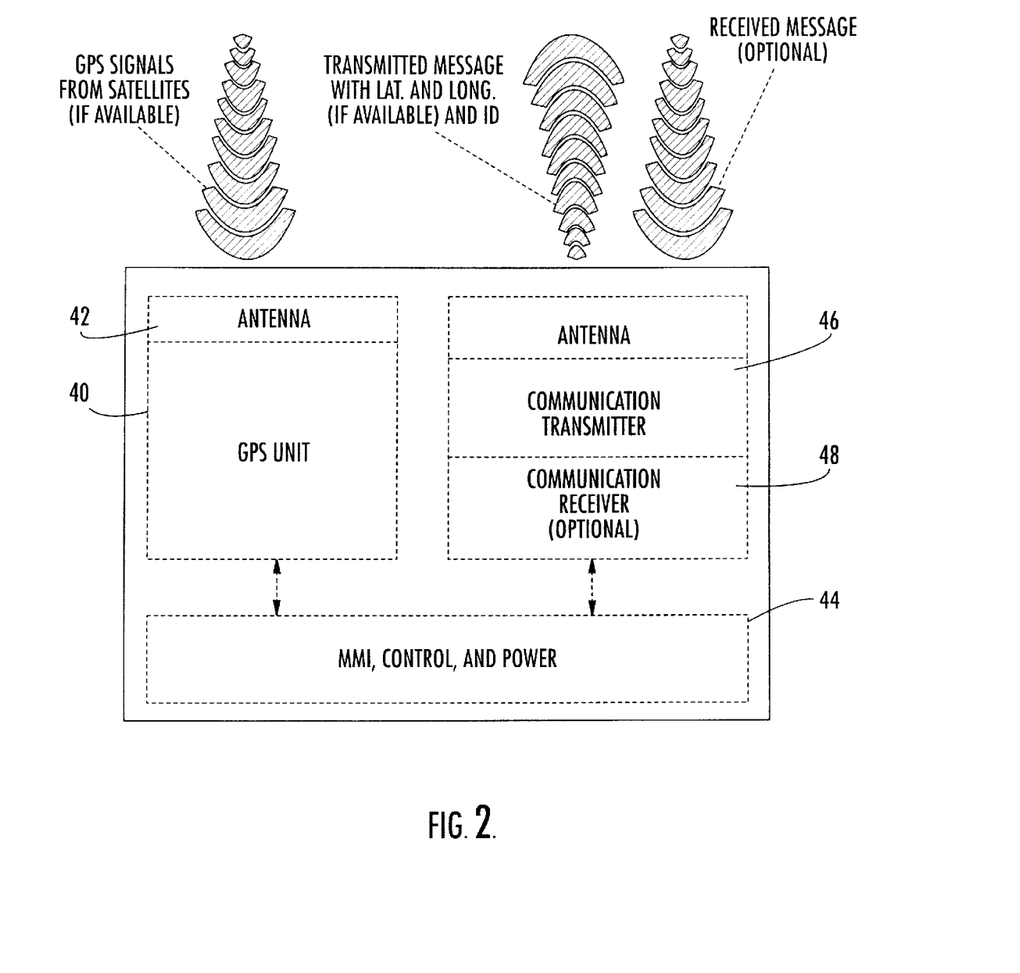
FIG. 2 is a schematic block illustration of a mobile unit that can be used with the present invention.

FIG. 2 illustrates in simplified block format a mobile unit 11, such as a cellular phone, having the basic components that can be used in the present invention. For example, the mobile unit 11 formed as a cellular phone would include a GPS receiver 40 and antenna 42 that is now incorporated within cellular phones by many manufacturers. The cellular phone would also include the MMI, control and power circuits 44, as is known to those skilled in the art, that operate with the communications transmitter and antenna 46. In some mobile units 11, a receiver could be optional, such as personal tracking units. As explained before, GPS signals from satellites are received, if available, and a transmitted message containing latitude and longitude coordinates or other GPS related data is transmitted to the type I receiver sites 14. A mobile unit identification, which could be a code is also transmitted. A message can also be received if the mobile unit is a complicated unit having a receiver, such as a cellular phone.

In still another aspect of the present invention, a personal tracking unit or other type of similar system for the mobile unit 11 could use a more simplified chirp generation circuit and system, such as a beacon transmitter. Chirp generation is just one example of a wide variety of signals that could be used. For example, a direct sequence (PN) waveform could also be used. Other techniques besides pulse position modulation can be used to transmit the data. Many different types of waveforms and modulation types can be used in addition to the chirp and pulse position modulation. In the following example, one type of chirp receiver is explained. Other types of implementations of a chirp circuitry could include a correlator or matched filter. An example of such a chirp system is described in U.S. Pat. No. 5,859,613 to Otto, issued Jan. 12, 1999, assigned to Harris Corporation of Melbourne, Fla., the disclosure which is hereby incorporated by reference in its entirety.

Figures 5, 6:
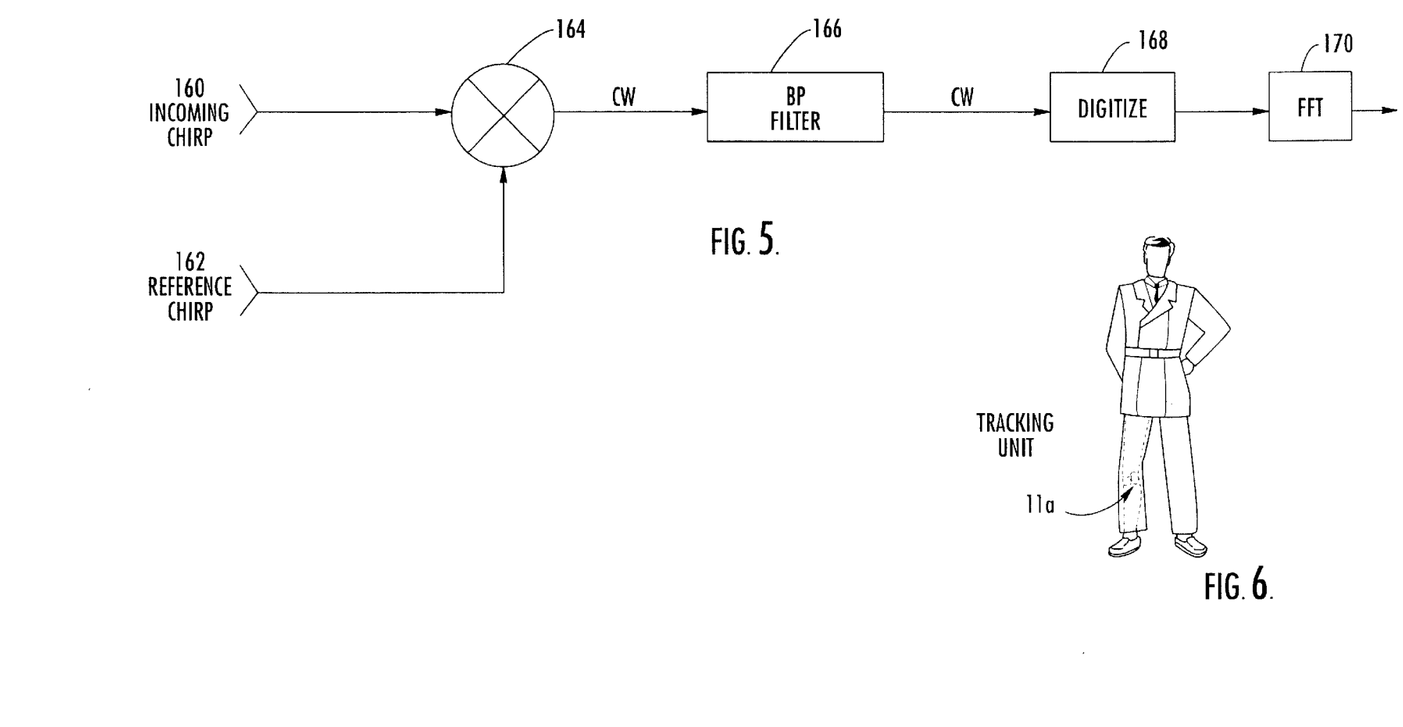
FIG. 5 is a simplified block diagram illustrating a decoding scheme that can be used in the present invention.
FIG. 6 illustrates an individual wearing a personal locator unit using the transmitter of the type shown in FIG. 3.

FIG. 6 illustrates an individual I wearing a mobile unit formed as a personal tracking unit 11a and positioned on the leg. Tracking unit 11a is a simplified mobile unit incorporating the GPS system and the chirp circuit as described below. Greater details of the operation of the circuit are disclosed in the incorporated by reference '613 patent.

Figure 3:
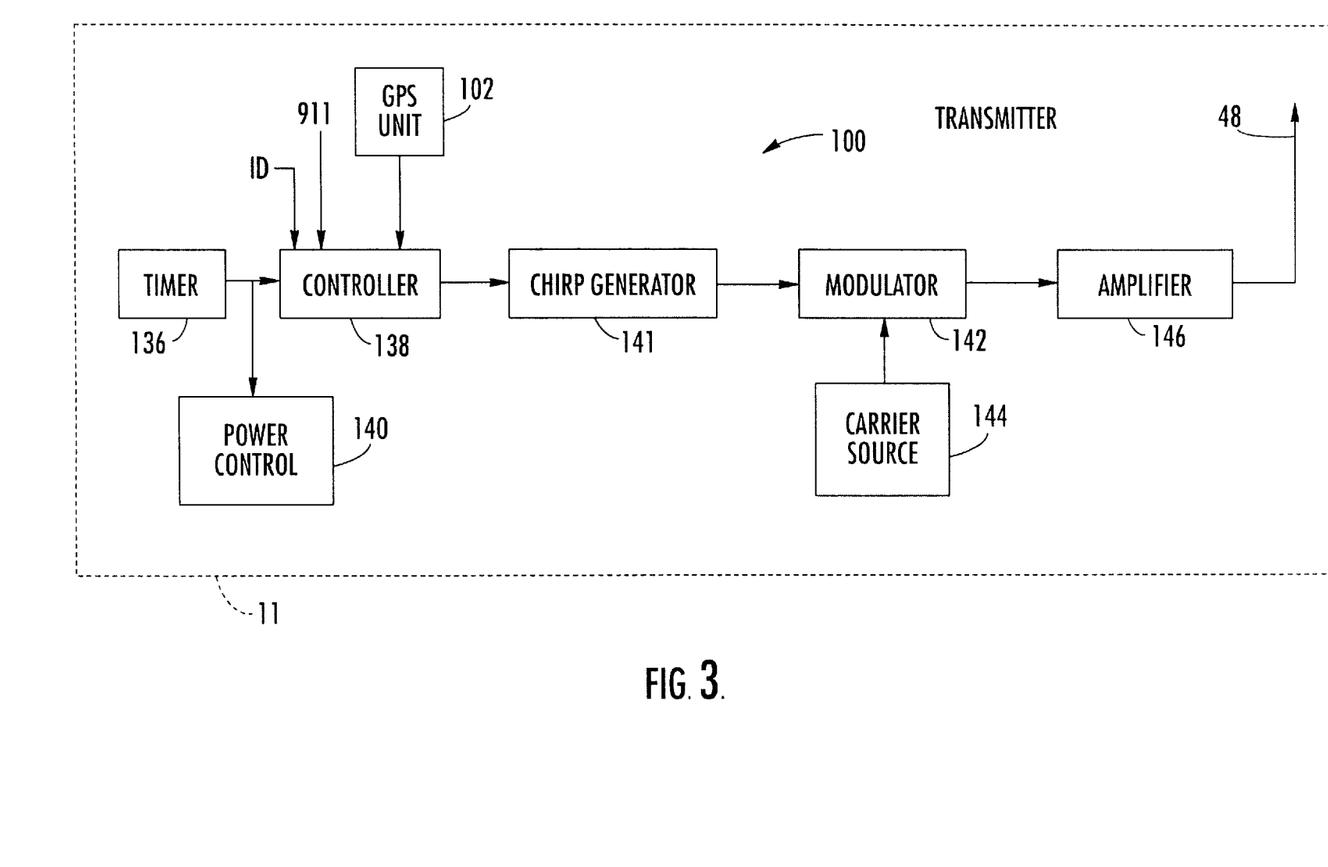
FIG. 3 is a simplified functional block diagram of a portion of a transmitter that can be used in the present invention.

With reference now to FIG. 3, a transmitter 100 of the mobile unit, shown in dotted lines at 11, may include a timer 136 to provide timing signals into a controller 138 and power control circuit 140. The controller 138 may also receive information signals such as identification signals or a signal indicating the use of a PANIC or 911 button on the external casing of the mobile unit 11. Based on the timing signals and the information signals, the controller 138 can initiate a chirp generator 141 to generate a chirp signal at a desired instant of time. The chirp signal is provided to one of the inputs of a modulator 142, which modulates a carrier signal received from a carrier source 144 with the chirp signal to provide a modulated signal. The modulated signal is provided to a power amplifier 146 and ultimately to an antenna 148 for propagation to one of the receiving stations (not shown).

In operation, the timer 136 provides timing signals to the controller 138 and the power control circuit 140. The timing signals are generated to provide the timing within a group (or "frame") of chirp signals or between consecutive groups of chirp signals in accordance with the particular signaling protocol used by the transmitter. The timing signals are also used to energize and de-energize other portions of the circuitry of the transmitter when such portions are not needed. For example, the timing signals, operating through the power control circuit, may cause the chirp generator 141 and transmission circuits (modulator 142, power amplifier 146, carrier source 144, etc.) to be de-energized when no transmission of signals are occurring.

Figure 4:
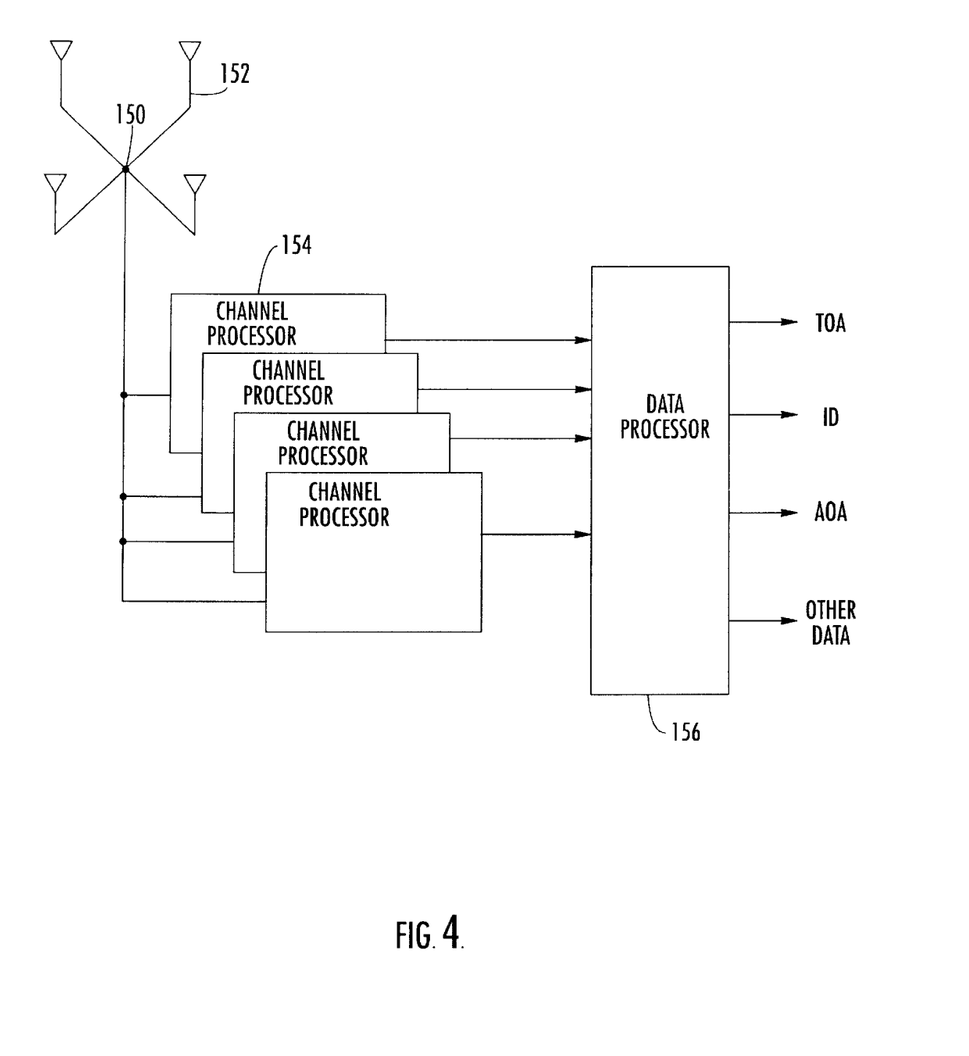
FIG. 4 is a simplified block diagram of a portion of a receiver that can be used in the present invention.

With continued reference to FIG. 4, the controller 138 uses the timing signals to encode the information to be transmitted using an encoding scheme of chirp signal position encoding, such as disclosed in the above identified '613 patent.

The information signals are received from a variety of sources, depending upon the specific information transmission needs of a particular system. An identification signal (ID) may be provided by switch settings, ROM programming, or a similar method of providing data, which is not harmed by the removal of power from the transmitter. It is possible that the simple identification signal acts as a beacon to be used for location by type II receivers. A PANIC or 911 signal may be initiated by a user through the operation of a panic or 911 button on the housing of the transmitter 100 or through the entry of a particular key sequence on a keyboard associated with the transmitter. The GPS unit 102 generates the respective GPS coordinates or other GPS measurements that are later transmitted to respective type I or type II receivers.

At the appropriate time, depending upon the application, the controller 138 causes chirps to be generated by the chirp generator 141 to encode the data desired to be transmitted. The framing of the encoded signals into one group of chirp signals or more than one group of chirp signals may be accomplished as needed for the length of the information to be sent. The generated chirps are used to modulate a carrier signal received from the carrier source 144 to provide a modulated signal, which is amplified by the power amplifier 146 and transmitted through an antenna 148 in a conventional fashion. The modulated signal may be filtered, pre-distorted or otherwise manipulated as is conventionally known and well within the skill of the artisan for the amplification and transmission of modulated signals in general.

The carrier source may be any conventional source of a carrier signal, such as, without limitation, a crystal oscillator, a digital signal synthesizer, an analog resonant circuit, or a signal provided by an external source. The chirp generator 141, modulator 142, carrier source 144, and related components may be either digital or analog devices.

With reference to FIG. 4, one embodiment of a receiving station of the present invention, such as could be used as a type I, II receiver or network overlay receiver, may include an antenna 150 having four separate receiving elements 152. The signals from the individual receiving elements 152 are provided to a like number of channel processors 154 which demodulate the signals received on the elements 152, decode the information contained therein, and in some instances, determine the time of arrival and/or angle of arrival of the decided signals at the respective elements 152. Information regarding the received decoded signals and their times of arrival and/or angles of arrival may be provided to a data processor 156, which may provide an indication of the identity of the transmitter that sent a signal, the data (if any) sent by the transmitter, and in some instances, the location of the transmitter as determined from the time and/or angle of arrival of the signals at the elements 154.

FIG. 5 illustrates a block diagram of a portion of a receiver. One system by which the signals received at the receiving stations may be decoded is illustrated, broadly, in FIG. 5 in which an incoming chirp 160 (after appropriate down conversion, filtering and amplification) is modulated by a reference chirp signal 162 by a modulator 164 at the receiving station. In practice, the reference chirp signal 162 should have similar characteristics to the chirp signal which was generated at the transmitter 100. Preferably, the reference chirp should match the received chirp signal in slope, that is, the plot of frequency versus time for the signals should have the same slope. As is known, the modulation of a chirp signal by another chirp signal generates a continuous wave signal ("CW") which has a frequency which is a direct function of the difference between the timing of the start of the two chirp signals. If the two chirps input to the modulator 164 have exactly the same timing, the output from the modulator 164 will be null. As the start timing between the two chirp signals increases, the frequency of the continuous wave signal generated by the modulator will increase.

If the chirps are relatively linear (as determined above), a frequency offset between the incoming chirp and the reference chirp will have relatively little effect on the performance of the system. If the chirp signals are relatively linear, a frequency offset has the same effect as a time offset between the incoming signal and the reference signal. As is explained below, the time differences between the signals from the remote transmitters and the receiving stations may be used to determine position by comparing the time differences at different receiving stations. Since these calculations are always relative to one another, the apparent time offset is removed at the system level by differential time of arrival processing. Thus, it is particularly advantageous in attempting to minimize the cost of the transmitter (by using relatively inexpensive timing circuits) to use a relatively linear chirp signal, which is a waveform known to have the above-described offset properties.

The use of the chirp generation transmitters and receivers as described above are advantageous because the type I receivers could be designed as a "receive only" receiver site, giving a more simplified system. The receivers also used in the second infrastructure of type II receivers could be formed as part of a network overlay.

The present invention is advantageous because the hybrid GPS location determination system as explained above allows a location determining capability in urban shadow areas where the GPS alone does not work. The mobile unit 11 could use only a single transmitter having a waveform that carries message traffic, including the mobile unit ID, and the GPS latitude and longitude or other information, if available. The characteristics of that same signal can be measured by type II receivers with or without network overlay to determine the location of the mobile unit when GPS coordinates are not available. With the use of the chirp generator system, such as shown in FIGS. 3–5, a very small, low cost and low power consumption mobile unit and system with high capacity can be realized.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for determining the location of a transmitting mobile unit comprising:
   a mobile unit having a Global Positioning System (GPS) unit and transmitter for transmitting an RF signal comprising an identification of the mobile unit and GPS location coordinates or other data obtained from the GPS unit, if available;
   a plurality of base stations forming a cellular telephone network;

at least one location determination receiver contained within an area of the cellular telephone network having good GPS reception for receiving a transmitted signal from the mobile unit when in the area relating to the identification of the mobile unit and the GPS location coordinates or other data obtained from the GPS unit;

a processor operatively connected to the at least one location determination receiver for determining the location of the mobile station based only on the transmitted signal from the mobile unit having GPS location coordinates or other data obtained from the GPS unit; and in an area of the cellular telephone network having poor GPS reception, a plurality of location determination receivers different from the location determination receivers contained within the area having good GPS reception and associated with the base stations of the cellular telephone network in the area having poor GPS reception and forming an overlay network to the cellular telephone network for receiving transmitted signals from the mobile unit when in the area having poor GPS reception relating to an identification of the mobile unit and for measuring the angle of arrival and/or the time of arrival, or multipath profile of transmitted signals from the mobile unit for use in determining the location of the mobile unit based only on the angle of arrival and/or the time of arrival or multipath profile.

2. A system according to claim 1, and further comprising a network processor operatively connected to said first and second plurality of location determination receivers for maintaining a real time record of the location of the mobile unit.

3. A system according to claim 1, wherein said mobile unit further comprises a cellular or other wireless phone.

4. A system according to claim 1, and further comprising a processor operatively connected to said plurality of location determination receivers in the area of the cellular network having poor GPS reception for computing the location of the mobile unit based on the measured angle of arrival and/or time of arrival, or multipath profile.

5. A system according to claim 1, wherein said transmitted signal comprises an emergency transmit signal.

6. A system for determining the location of a mobile unit comprising:

a mobile unit having a Global Positioning System (GPS) unit and transmitter for transmitting an RF signal comprising an identification of the mobile unit and GPS location coordinates or other GPS data, if available;

a plurality of base stations forming a cellular telephone network;

at least one location determination receiver contained within an area of the cellular telephone network having good GPS reception for receiving a transmitted signal from the mobile unit when in the area relating to the identification of the mobile unit and the GPS location coordinates obtained from the GPS unit;

a processor operatively connected to the at least one location determination receiver for determining the location of the mobile station based only on the transmitted signal from the mobile unit having GPS location coordinates or other data obtained from the GPS unit;

in an area of the cellular telephone network having poor GPS reception, a plurality of location determination receivers different from the location determination receivers contained within the area having good GPS reception and associated with the base stations of the cellular telephone network in the area having poor GPS reception and forming an overlay network to the cellular telephone network for receiving transmitted signals from the mobile unit when in the area relating to an identification of the mobile unit and for measuring the angle of arrival and/or the time of arrival, and multipath profile of transmitted signals from the mobile unit; and a processor operatively connected to said plurality of location determination receivers for computing the location of the mobile unit contained within the area covered by the plurality of location determination receivers based only on the measured angle of arrival and/or time of arrival, or multipath profile.

7. A system according to claim 6, wherein said mobile unit further comprises a cellular or wireless phone.

8. A system according to claim 6, wherein said transmitted signal comprises an emergency transmit signal.

9. A system for determining the location of a transmitting mobile unit comprising:

a mobile unit having a Global Positioning System (GPS) and transmitter for transmitting an RF signal comprising an identification of the mobile unit and GPS location coordinates or other data, if available;

a plurality of base stations forming a cellular telephone network;

a first plurality of location determination receivers contained within an area of the cellular telephone network having good GPS reception for receiving a transmitted signal from the mobile unit relating to the identification of the mobile unit and GPS location coordinates obtained from the GPS unit;

a processor operatively connected to the at least one location determination receiver for determining the location of the mobile station based only on the transmitted signal from the mobile unit having GPS location coordinates or other data obtained from the GPS unit;

in an area of the cellular telephone network having poor GPS reception, a second plurality of location determination receivers different from the location determination receivers contained within the area having good GPS reception and associated with the base stations of the cellular telephone network in the area having poor GPS reception and forming an overlay location determination network to the cellular telephone network for receiving transmitted signals from a mobile unit when in the area relating to an identification of the mobile unit and for measuring the angle of arrival and/or the time of arrival, or multipath profile;

a processor operatively connected to said second plurality of receivers for computing the location of the cellular phone contained within the area covered by the second plurality of receivers based only on the measured angle of arrival and/or time of arrival, or multipath profile; and a network processor operatively connected to said first and second plurality of location determination receivers for maintaining a real time record of the location of the mobile unit within the areas having both good and poor GPS reception.

10. A system according to claim 9, wherein said mobile unit further comprises a cellular or wireless phone.

11. A system according to claim 9, wherein said transmitted signal comprises an emergency 911 transmit signal.

12. A system for determining the location of a transmitting mobile unit comprising:

a mobile unit having a Global Positioning System (GPS) unit and chirp transmitter for transmitting a chirp signal containing modulated digital data that includes an identification of the mobile unit and GPS location coordinates, if available;

a plurality of base stations forming a cellular telephone network;

at least one location determination receiver contained within an area of the cellular telephone network having good GPS reception for receiving a transmitted chirp signal from the mobile unit relating to an identification of the mobile unit and GPS location coordinates or other data obtained from the GPS unit;

a processor operatively connected to the at least one location determination receiver for determining the location of the mobile station based only on the transmitted chirp signal from the mobile unit having GPS location coordinates or other data obtained from the GPS unit;

a second plurality of location determination receivers different from the location determination receivers contained in the area having good GPS reception and contained within areas of the cellular telephone network having poor GPS reception for receiving transmitted chirp signals from a mobile unit relating to an identification of the mobile unit and for measuring the angle of arrival and/or the time of arrival or multipath profile of transmitted signals from the mobile unit and used for determining the location of the mobile unit based only on the angle of arrival and/or the time of arrival or multipath profile; and wherein said location determination receivers in said area having poor GPS reception comprises a chirp signal generator and a mixer which periodically mixes a lower frequency signal with a chirp signal received from said chirp signal generator to produce a wave signal having a frequency related to the time relationship between the start of the chirp signal and the start of digital data.

13. A system according to claim 12, wherein said mobile unit further comprises a wireless emergency transmitter.

14. A system according to claim 12, and further comprising a network processor operatively connected to said location determination receivers for maintaining real time record of the location of the mobile unit.

15. A system according to claim 12, wherein said mobile unit further comprises a cellular or wireless phone.

16. A system according to claim 12, and further comprising a processor operatively connected to said plurality of location determination receivers in the area of the cellular network having poor GPS reception for computing the location of the cellular or wireless phone based only on the measured angle of arrival and/or time of arrival or multipath profile.

17. A system according to claim 12, wherein said transmitted signal comprises an emergency transmit signal.

18. A system for determining the location of a transmitting mobile unit comprising:

a mobile unit having a Global Positioning System (GPS) and chirp transmitter for transmitting a chirp signal containing modulated digital data that includes an identification and GPS location coordinates or other data, if available;

a plurality of base stations forming a cellular telephone network;

at least one location determination receiver contained within an area having good GPS reception for receiving a transmitted chirp signal from a mobile unit when in the area relating to an identification of the mobile unit and GPS location coordinates or other data obtained from the GPS unit;

a processor operatively connected to the at least one location determination receiver for determining the location of the mobile station based only on the transmitted chirp signal from the mobile unit having GPS location coordinates or other data obtained from the GPS unit;

a second plurality of location determination receivers different from the location determination receivers contained within the area having good GPS reception and contained within an area of the cellular telephone network having poor GPS reception for receiving transmitted chirp signals from a mobile unit when in the area relating to an identification of the mobile unit and measuring the angle of arrival of a signal and/or the time of arrival or multipath profile of transmitted signals from the mobile unit to determine the location of the mobile unit;

wherein each of said location determination receivers comprises a chirp signal generator and a mixer which periodically mixes said lower frequency signal with a chirp signal received from said chirp signal generator to produce a wave signal having a frequency related to the time relationship between the start of the chirp signal and the start of digital data;

a processor operatively connected to said plurality of location determination receivers in the area having poor GPS reception for computing the location of the mobile unit based only on the measured angle of arrival and/or time of arrival or multipath profile; and a network processor operatively connected to said location determination receivers for maintaining a real time record of the location of the mobile unit.

19. A system according to claim 18, wherein said mobile unit further comprises a wireless emergency transmitter.

20. A system according to claim 18, and further comprising a network processor operatively connected to said plurality of location determination receivers for maintaining a real time record of the location of the mobile unit.

21. A system according to claim 18, wherein said mobile unit further comprises a cellular or wireless phone.

22. A system according to claim 21, wherein said transmitted signal comprises an emergency transmitted signal.

* * * * *